United States Patent [19]
Czosnowski et al.

[11] Patent Number: 5,764,043
[45] Date of Patent: Jun. 9, 1998

[54] TRACEABLE PATCH CORD AND CONNECTOR ASSEMBLY AND METHOD FOR LOCATING PATCH CORD ENDS

[75] Inventors: Wladyslaw Michal Czosnowski; Guy Castonguay, both of Ft. Worth; J. D. Harvey, Trophy Club, all of Tex.

[73] Assignee: Siecor Corporation, Hickory, N.C.

[21] Appl. No.: 772,206

[22] Filed: Dec. 20, 1996

[51] Int. Cl.⁶ .................. G01R 31/02; G01R 19/145; G02B 6/46; H01R 3/00
[52] U.S. Cl. .................. 324/66; 324/149; 324/538; 379/25; 385/101; 439/490
[58] Field of Search .................. 324/149, 66, 67, 324/508, 538–542, 556, 133; 439/482, 488–490, 955; 379/25, 26; 385/101; 340/825.49

[56] References Cited

U.S. PATENT DOCUMENTS

| | | |
|---|---|---|
| 1,738,710 | 2/1929 | Jones . |
| 3,052,842 | 9/1962 | Frohman et al. ................ 324/66 |
| 3,771,098 | 11/1973 | Dempsey ................ 324/508 X |
| 3,914,561 | 10/1975 | Schardt et al. . |
| 3,942,859 | 3/1976 | Korodi . |
| 4,114,091 | 9/1978 | Howard . |
| 4,549,783 | 10/1985 | Schmachtenberg . |
| 4,767,181 | 8/1988 | McEowen . |
| 4,864,225 | 9/1989 | Long et al. . |
| 4,937,529 | 6/1990 | O Toole et al. . |
| 5,081,627 | 1/1992 | Yu . |
| 5,222,164 | 6/1993 | Bass et al. . |
| 5,244,409 | 9/1993 | Guss et al. . |
| 5,265,187 | 11/1993 | Morin et al. . |
| 5,280,554 | 1/1994 | Gleim et al. . |
| 5,305,405 | 4/1994 | Emmons et al. . |
| 5,353,367 | 10/1994 | Czosnowski et al. . |
| 5,613,873 | 3/1997 | Bell, Jr. ................ 439/490 |

*Primary Examiner*—Gerard R. Strecker

[57] ABSTRACT

A system for locating corresponding ends of a patch cord used to conduct a signal between a first receptacle and a second receptacle. The system includes a cable having a main signal transmission means and a pair of electrically conductive members extending along the length of the cable. A first connector is attached to one end of the cable and a second connector is attached to the other end of the cable. The first and second connectors are adapted to removably mate with the first and second receptacles, respectively. The first connector has a pair of leads associated therewith. Each of the leads is connected to and corresponds to one of the conductive members. An electrical indicator is attached to the first receptacle. The indicator is electrically connected to the pair of leads when the first connector is mated to the first receptacle. A power supply is used to apply current through the conductive members so that upon application of the current, the indicator is activated.

27 Claims, 5 Drawing Sheets

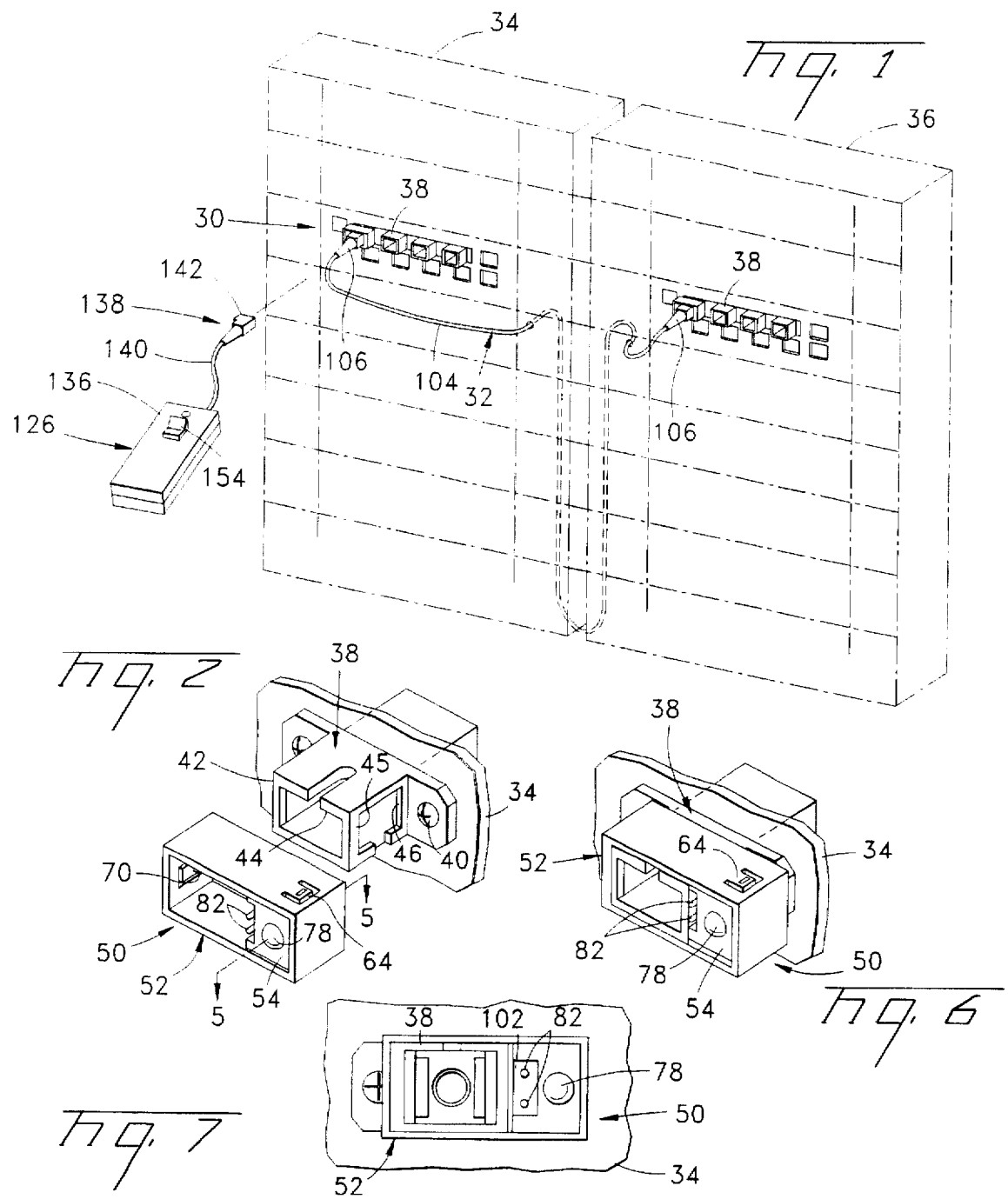

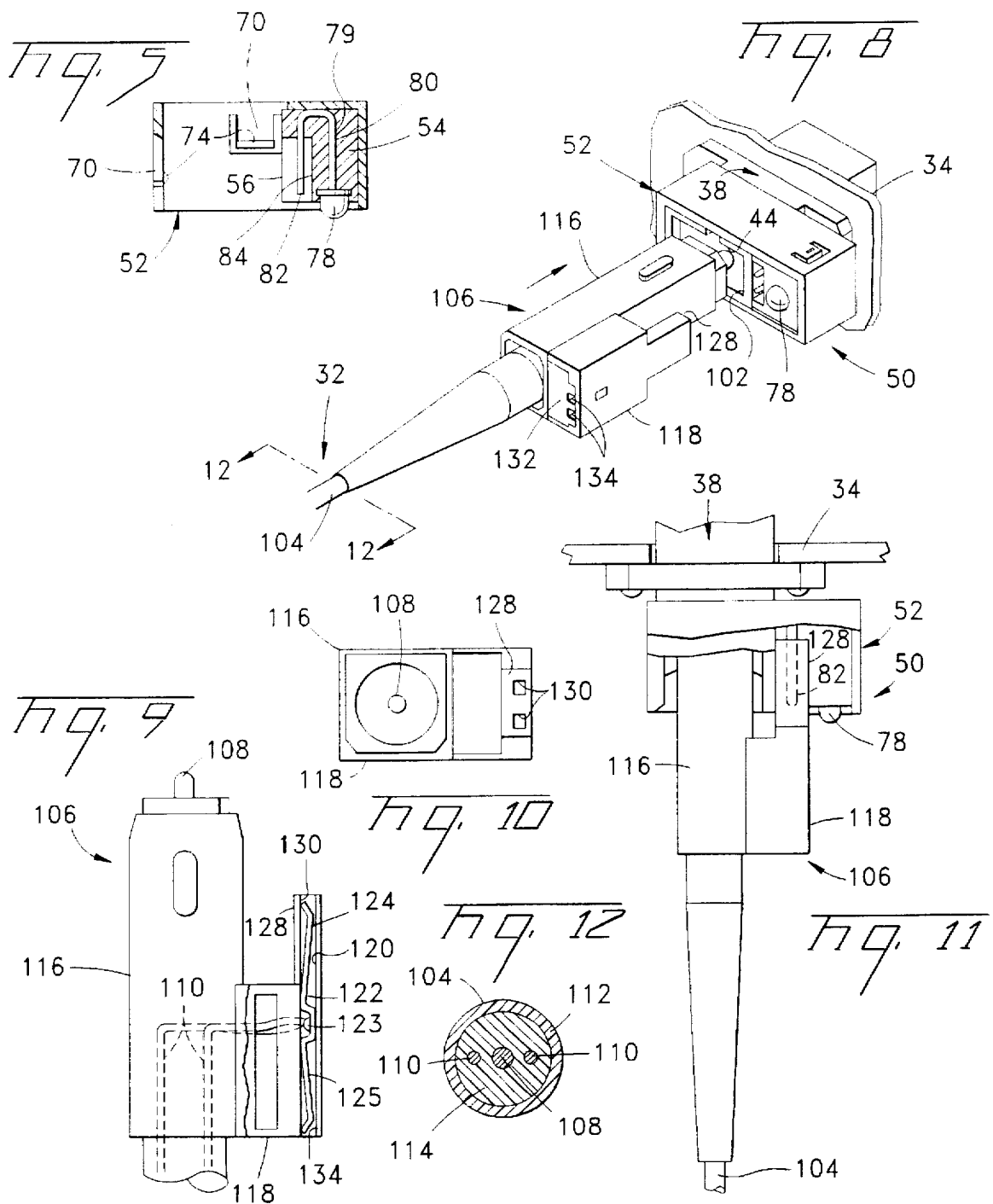

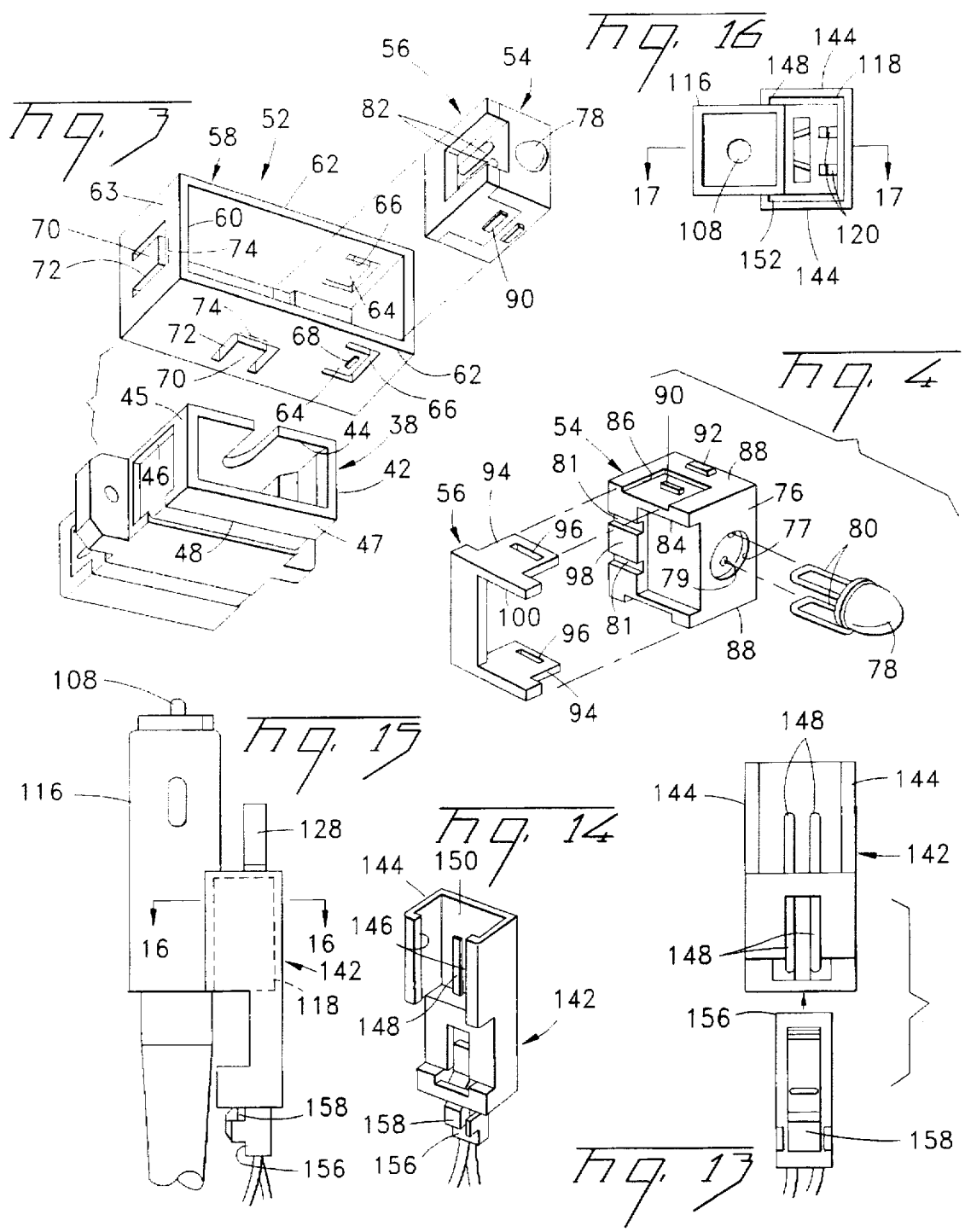

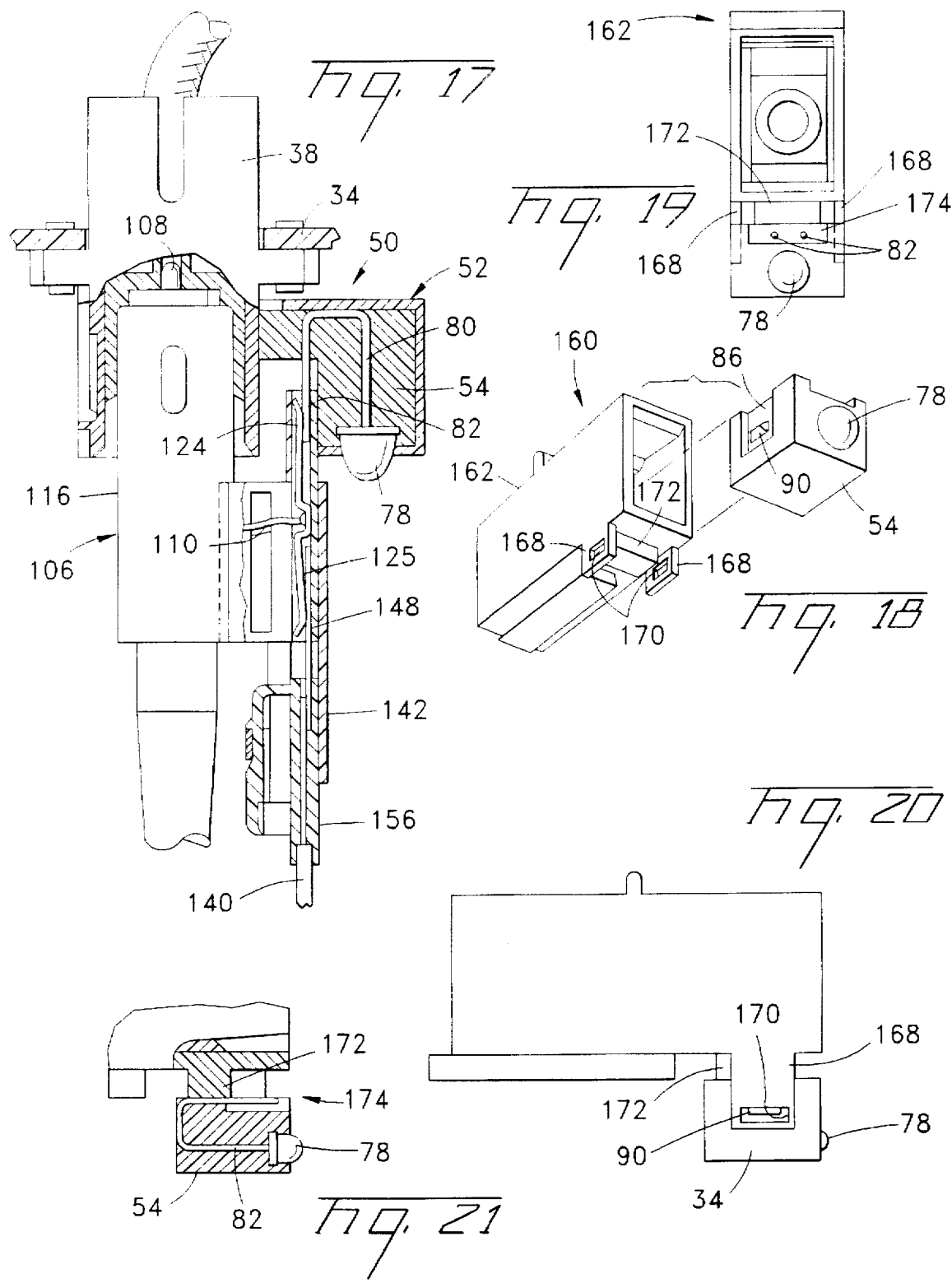

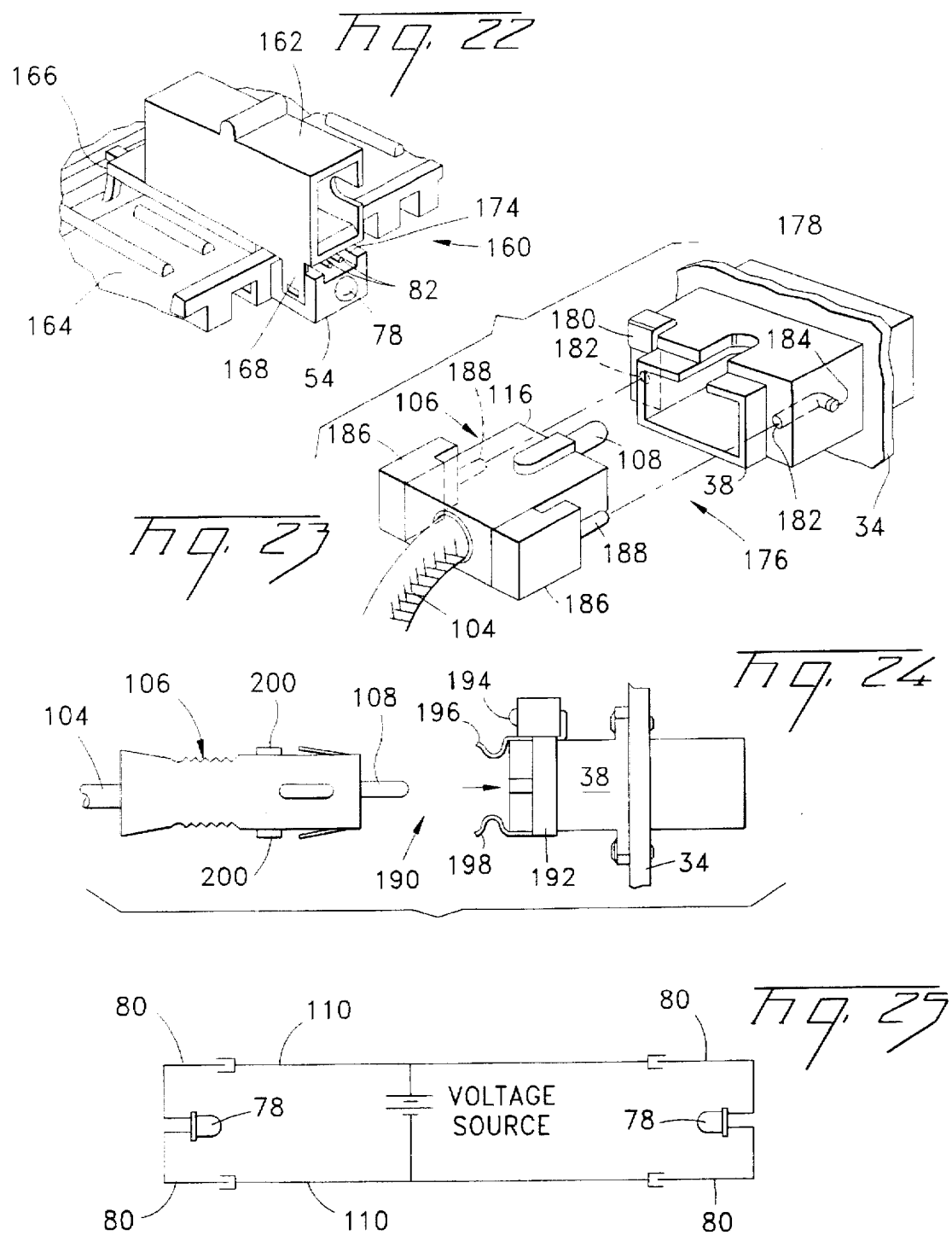

TRACEABLE PATCH CORD AND CONNECTOR ASSEMBLY AND METHOD FOR LOCATING PATCH CORD ENDS

BACKGROUND OF THE INVENTION

This invention relates to a system for locating at least one end of a patch cord utilized for connection of telecommunications equipment.

In order for various telecommunication devices and equipment to function together as a network or system, the devices or equipment must be connected together via a signal transmission member that is used to convey communication signals from one device to the other. The structure used to connect devices or equipment together typically includes a cable having connectors disposed on opposite ends of the cable that removably mate with receptacles attached to the frames or bodies of the telecommunication devices or equipment. These cables with connectors on each end are typically referred to as patch cords. The signal transmission member in the cable can be of an electrical type, for instance, a coaxial cable, or in the form of optical fibers positioned in an optical cable to transmit telecommunication signals. At present, telecommunication needs require the ability to transmit a large volume of information in a short period of time, thus making the use of highly efficient optical cable preferable.

Oftentimes a large number of patch cords will be used at a telecommunication location where various centralized switching and routing operations take place. Such locations are often referred to as central office locations. Examples of the type of switching and distribution equipment found in central offices can be found in U.S. Pat. Nos. 4,792,203 and 5,071,211. Generally, these patents disclose optical receptacles attached to holders or trays. Such holders are stacked, for convenience, in one or more vertical banks in distribution frames. The holders having the receptacles are either pivotally or slidably mounted to the frames to allow easy connection between the patch cord connectors and the receptacles. With these types of arrangements at telecommunication locations, receptacles of one bank of holders are selectively interconnected to receptacles of another bank of holders by patch cords. A serious problem which may result from this structure is the difficulty of easily and quickly locating the ends of the patch cord after the patch cord has been installed. More specifically, it inevitably becomes necessary or desirable either to replace a patch cord or to change the positions of the patch cords which is to change the receptacles to which the patch cords interconnect. Typically, one end of the patch cord is known, but it is necessary to determine where the other end of the patch cord is connected. Usually, cross connections of patch cords are identified using on-frame labeling, log books, or computerized data bases. However, as with any manual system, there is always an opportunity for human error. If an item of data is erroneously recorded or if an identification label is misread, the possibility of disconnecting a working cable can become a dreadful reality. As one can appreciate, this problem dramatically increases in difficulty as the number of patch cords increases, the increased density of the patch cords being particularly present at central office locations. With today's systems operating at such tremendous data rates, accidental disconnection can have drastic consequences.

Various systems have been developed for locating the ends of a patch cord. One such system can be found in U.S. Pat. No. 5,265,187. The structure in this patent includes a cable having metal connectors on each end with a conductor wire connecting the connectors together. The system of the patent includes a complicated conductive grounding system including a conductor bus associated with each holder, a terminal plate associated with each holder, and a ground conductor bar associated with each distribution frame. As is apparent, these structures are built into the distribution frame and a junction box having clamp wires is associated with each distribution frame. Therefore this system requires substantial structure to be built into the distribution frames, thus not allowing modification of existing frames. Further, this system requires a somewhat time-consuming two-step method to locate a corresponding end of a patch cord. More specifically, as a first step, the holder which contains the unknown end is located by the junction boxes and a light-emitting diode associated with the holder. This first step only locates the holder in which the unknown end is disposed. Thereafter, current must be applied to each of the connectors in the located holder. As is apparent, this two-step process is disadvantageous because it can take a substantial amount of time to locate the unknown connector end.

An additional system for locating ends of a patch cord is found in U.S. Pat. No. 5,353,367. This patent discloses a system having an optical cable with an optical test fiber running with the cable, but separating from the cable adjacent the end of the cable. The test fiber is positionable in slots located on a front surface of the holder. Corresponding ends of the patch cords are located by projecting light into one end of the test fiber associated with one connector so that it illuminates the end of the test fiber associated with the other end of the connector. As is apparent, this structure suffers from the disadvantage of having to have a separate structure to hold the ends of the test fiber. Further, the size of the test fiber necessary to create a sufficient visual indicator on the other end can be somewhat substantial with respect to the overall size of the patch cord, thus making the patch cord bulky and undesirable. Still further, the longer the patch cord, the more attenuated the transmission of the light becomes, thus sometimes resulting in an insufficient visible glow on the opposite corresponding end of the cable.

Another location system is described in U.S. Pat. No. 5,305,405. This patent discloses a cable having an optical fiber member for transmitting signals between two ends of a cable terminating in connectors. Secondary optical fibers also extend along the cable and terminate in couplings which are disposed along the cable inside of the connector. A light source is applied to one of the couplings and travels through the secondary optical fibers and illuminates the other coupling to locate the other corresponding end of the patch cord. As is apparent, this system suffers from numerous disadvantages. First of all, the indicating couplings are carried on the patch cord itself, thus increasing the possibility of damage to the couplings during connection of the patch cord. Additionally, the further the indicator coupling is away from the end of the patch cord, the harder it is to associate the coupling with the unknown end. This problem is greatly exacerbated if numerous patch cords are connected at a location such that the indicator couplings can move with the cable and overlap or intertwine upon one another. This system suffers from the further disadvantage in that the light transmitted through the secondary fibers becomes attenuated if the patch cord is of substantial length. Even if the patch cord is not of substantial length, the couplers usually will not offer a vibrant bright indication of the unknown end that is visible from a distance away from the end. The patent does disclose the possibility of light-emitting diodes (LEDs) being positioned on the couplings attached to the cable. As is apparent, by attaching the LEDs to the cable, the possibility of damage to the LEDs during installation is vastly increased. Further, the positioning of the LED away from the receptacle of the device being connected can result in confusion as to which connector is to be indicated, especially when there are large numbers of patch cords used to perform the connections between equipment.

Therefore, a system for locating patch cord ends is needed which will overcome the problems with the prior art systems discussed above.

SUMMARY OF THE INVENTION

Accordingly, it is an object of the present invention to provide a system for locating corresponding ends of a patch cord which allows easy, efficient and clear location of such ends.

Another object of this invention is to provide a locating system which allows easy conversion of existing telecommunication devices so as to accommodate the locating system.

A further object of this invention is to provide a locating system which ensures that the indicator structure on the ends of the patch cord can be easily seen from a substantial distance.

A still further object of this invention is to provide an indicator assembly which includes indicator modules that can be adapted to be attached to different arrangements of receptacles.

Another object of this invention is to provide a locating system wherein the locating members do not significantly affect the size of the patch cord cable.

A further object of this invention is to provide a patch cord coupling assembly which allows easy and efficient connection of conductive members in the patch cord cable to an indicator member connected to the receptacle.

Accordingly, the present invention provides for a system for locating corresponding ends of a patch cord used to conduct a signal between a first receptacle and a second receptacle. The system has a cable with a main signal transmission member and a pair of electrically conductive members extending along the length of the cable. A first connector is attached to one end of the cable and a second connector is attached to the other end of the cable. The first and second connectors are adapted to removably mate with the first and second receptacles, respectively. The first connector has a pair of leads associated therewith. Each lead is connected to and corresponds to one of the conductive members. An electrical indicator is attached to the first receptacle. The indicator is electrically connected to the pair of leads when the first connector is mated to the first receptacle. A power supply is provided for applying a current through the conductive members so that upon application of the current the indicator is activated.

Additional objects, advantages and novel features of the invention will be set forth in part in the description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith and in which like reference numerals are used to indicate like parts in the various views:

FIG. 1 is a front perspective view of a pair of telecommunication distribution frames embodying the principles of this invention;

FIG. 2 is an exploded top perspective view of a single receptacle of FIG. 1 showing an indicator assembly prior to being connected to the receptacle;

FIG. 3 is an exploded bottom perspective view showing the positioning of an indicator module and cover within a shroud prior to connection of the indicator assembly to an individual receptacle;

FIG. 4 is an exploded perspective view of the indicator module showing assembly of the cover thereon;

FIG. 5 is a sectional view taken along plane 5—5 of FIG. 2 showing the indicator module coupled to the connecting shroud;

FIG. 6 is a top perspective view similar to FIG. 2 showing the indicator assembly attached to the receptacle;

FIG. 7 is a front elevational view of the receptacle and attached indicator assembly shown in FIG. 6;

FIG. 8 is a top perspective view of the receptacle and indicator assembly of FIG. 6 showing the placement of one connector of a patch cord into the receptacle and assembly;

FIG. 9 is a top plan view of the connector shown in FIG. 8, parts being broken away and shown in cross section to reveal details of construction, and conductive members shown in phantom lines;

FIG. 10 is a front elevational view of the connector shown in FIG. 8;

FIG. 11 is a top plan view showing the connector of FIG. 8 coupled to the receptacle and indicator assembly, parts being broken away and shown in cross section to reveal details of construction;

FIG. 12 is a cross-sectional view taken generally along lines 12—12 of FIG. 8 and showing the construction of the patch cord cable;

FIG. 13 is a top plan view of a probe end showing the connection of the probe end to a plug member of the power supply unit;

FIG. 14 is a top perspective view of the probe end of FIG. 13 attached to the plug member of the power supply unit.

FIG. 15 is a top plan view of the connector of FIG. 8 with the probe end slidably coupled thereto;

FIG. 16 is a cross-sectional view taken generally along line 16—16 of FIG. 15;

FIG. 17 is a cross-sectional view taken generally along line 17—17 of FIG. 16 and showing the connector coupled to the receptacle and the probe end coupled to the connector such that current can be applied to actuate the indicator assembly;

FIG. 18 is an exploded bottom perspective view of an alternative indicator assembly;

FIG. 19 is a front elevational view of the assembled indicator assembly of FIG. 18;

FIG. 20 is a side plan view of the indicator assembly of FIG. 19;

FIG. 21 is an enlarged partial view similar to FIG. 20 showing the indicator module, parts being broken away and shown in cross section to reveal details of construction;

FIG. 22 is a top perspective view of the indicator assembly of FIG. 18 attached to a holding tray of a distribution frame;

FIG. 23 is a top perspective view of another alternative indicator assembly showing the connection of a patch cord connector to the indicator assembly;

FIG. 24 is a top plan view of a further alternative indicator assembly again showing the connection of a patch cord connector to the indicator assembly; and FIG. 25 is a schematic view of the circuit formed by all the indicator assemblies of the above figures.

DETAILED DESCRIPTION OF THE PREFERRED EMBODIMENTS

Referring to the drawings in greater detail, and initially to FIG. 1, a locating system designated generally by the numeral 30 is shown. System 30 is used to locate corresponding ends of a patch cord 32 which connects telecommunication distribution frames 34 and 36. Although system 30 is shown in FIG. 1 utilized with the connection of distribution frames 34 and 36, system 30 can be utilized in the connection of any type of telecommunication devices where it is necessary to locate the corresponding ends of a patch cord connecting the devices together. Each frame 34 or 36 includes a plurality of receptacles 38 which are used to connect the ends of patch cord 32 to the interior workings of the frame. Each receptacle 38 is attached to its respective frame via any suitable attaching structure, for instance, screws 40, as best shown in FIG. 2. Each receptacle 38 includes a rectangular shaped perimeter wall 42 which defines a rectangular shaped connecting aperture 44. It is within the aperture 44 that the connection of the main signal transmission member (for instance, an optical fiber) of patch cord 32 to the corresponding frame takes place in a manner that is well-known to one of ordinary skill in the art. Positioned on opposite end portions 45 of wall 42 are connecting recesses 46, as best shown in FIGS. 2 and 3. Positioned on one length portion 47 of wall 42 is a further connecting recess 48, as best shown in FIG. 3. Recesses 46 and 48 are used to connect an indicator assembly 50 to receptacle 38, as will be more fully described below.

With reference to FIGS. 2-7, assembly 50 includes connecting shroud 52, light-emitting diode (LED) module 54, and module cover 56. Shroud 52 includes a generally rectangular perimeter wall 58 having length portions 62 and end portions 63 and defining a rectangular aperture 60. Opposing length portions 62 of wall 58 have module attaching tabs 64 formed therein, as best shown in FIG. 3. Tabs 64 are formed by C-shaped slots 66 that extend completely through portions 62 such that tabs 64 can be flexed slightly outwardly during attachment of module 54, as will be more fully described below. Each tab 64 also has attaching aperture 68 formed therein for engaging structure of module 54 to secure the module in place.

One of length portions 62 and one of end portions 63 each have a receptacle attaching tab 70 formed therein, as best shown in FIG. 3. Tabs 70 are formed in portion 62 and portion 63 by C-shaped slots 72 which extend completely through the wall portions so that tabs 70 can be flexed slightly outwardly for connection to a receptacle 38. More specifically, each tab 70 has a ridge 74 formed on an inner surface. Ridge 74 on tab 70 associated with portion 62 engages receptacle recess 48, and ridge 74 of tab 70 associated with portion 63 engages the receptacle recess 46 that is distal from module 54 in the finished indicator assembly 50.

Module 54 includes a body portion 76 which has a circular recess 77 that receives LED 78, as best shown in FIGS. 4 and 5. LED 78 has a pair of electrical wires 80 that are disposed through bores 79 formed in body 76. Wires 80 are bent approximately 180 degrees into L-shaped channels 81 to form connecting prongs 82. Prongs 82 are positioned in a generally rectangular indentation 84 which serves as an area for connection of locating system structure associated with the patch cord, as will be more fully explained below.

Body 76 also has cover connecting recesses 86 formed on opposite end surfaces 88. Disposed in each recess 86 is a cover connecting ridge 90. Each surface 88 also has a shroud connecting protrusion 92 extending therefrom.

With reference to FIG. 4, module cover 56 has a pair of flexible attaching legs 94 extending perpendicularly from opposite ends thereof. Each leg 94 has an attaching slot 96 formed therein. Legs 94 are adapted to mate with recesses 86 of body 76 such that slots 96 receive ridges 90 to hold cover 56 in place on a top surface 98 of body 76. Cover 56 overlays the exposed portions of wires 80 when attached to body 76 such as to reinforce the formation of connecting prongs 82. Cover 56 also has a generally rectangular cutout 100 that corresponds to the shape of indentation 84.

Assembly 50 is assembled by first attaching cover 56 to module 54 by snapping legs 94 into engagement with recesses 86 such that slots 96 receive ridges 90, as shown in FIG. 4. Thereafter, the combined structure of module 54 and cover 56 are snapped into place into the end of shroud 52 having attaching tabs 64, as shown in FIGS. 3 and 5. More specifically, the cover/module combination is inserted into an intermediate region of shroud 52 and then slid downwardly toward tabs 64 so that tabs 64 are deflected outwardly by protrusions 92 until protrusions 92 are received in apertures 68 in a snapping action to securely position the cover module within the shroud. This combination of the module/cover/shroud leaves a vacant space within shroud 52 that will receive wall 42 of receptacle 38, as best shown in FIG. 5. More specifically, the module/cover/shroud combination is slipped over receptacle 38 until ridges 74 of the receptacle attaching tabs 70 engage their corresponding recesses 46 and 48 with a snapping action to secure assembly 50 to receptacle 38, as shown in FIGS. 2 and 6. As is apparent, when assembly 50 is attached to receptacle 38, a plug-in area 102 is formed by indentation 84 of module 54, cutout 100 of cover 56, and an adjacent end 45 of receptacle 38, as shown in FIG. 7.

Shroud 52, module 54, and module cover 56 are all formed of a suitable electrically insulative plastic material which is sufficiently pliable to allow flexation of tabs 64, tabs 70, and legs 94 so that the shroud, module and cover can be snapped together to form assembly 50 as described above. The plastic material should be such as to withstand storage temperatures of minus 40 C. to plus 80 C. and operating temperatures of 0 C. to plus 70 C.

With reference to FIGS. 1 and 8-12, patch cord 32 includes a cable 104 and connectors 106 which are disposed on opposite ends of the cable and which are used to connect the respective ends of the cable to frames 34 and 36. Cable 104 includes a main signal transmission member 108, such as an optical fiber, and a pair of electrically conductive wires 110 disposed on opposite sides of member 108, as best shown in FIG. 12. A jacket 112 encircles both member 108 and wires 110, and an insulative and strength material 114 is positioned between jacket 112 and member 108 and wires 110. Member 108 preferably consists of single mode 900 micron buffered fibers. It has been found advantageous for wires 110 to have a diameter of approximately 0.50 mm. and consist of 32 AWG copper wire with a PVC coating. Jacket 112 also preferably is made of PVC and strength material 114 is preferably Kevlar. The overall diameter of assembled cable 104 is preferably approximately 2.4 mm.

Each connector 106 includes a body 116 which is used to connect transmission member 108 to a corresponding transmission member in receptacle 38. More specifically, body 116 connects with aperture 44 of receptacle 38 in a conventional manner such that signals conveyed via member 108 are transferred to the appropriate inner workings of frames 34 or 36, as best shown in FIGS. 8 and 11. Body 116 has a terminal housing 118 attached thereto. Housing 118 has a pair of parallel channels 120 formed therein for receiving electrical terminals 122. With reference to FIG. 9, each terminal 122 is generally elongated in shape with a connecting point 123 for one of wires 110 at its center. Extending one direction from each point 123 is a contacting portion 124 which is used to engage a prong 82 of assembly 50 and extending in the other direction is a contacting portion 125 which is used to engage corresponding structure on a power supply unit 126 shown in FIG. 1, as will be more fully explained below.

Wires 110 extend through body 116 and into housing 118 for connection to terminals 122, as shown in FIG. 9. Housing 118 has a plug protrusion 128 which engages plug-in area 102 of indicator assembly 50. More specifically, protrusion 128 has a pair of access apertures 130 formed in its distal end which receive prongs 82 when protrusion 128 is received in area 102 which occurs when body 116 is connected to receptacle 38, as best shown in FIGS. 8 and 11. Therefore, attachment of connector 106 to receptacle 38 results in electrical contact between LED 78 and terminals 122 through area 102 and protrusion 128.

The rear surface 132 of housing 118 also has a pair of plug apertures 134 which open to channels 120, as best shown in FIGS. 8 and 9. Apertures 134 provide electrical access to terminal portions 125 such that a power supply unit 126 can be connected thereto in a manner that will be described below.

As shown in FIG. 1, power supply unit 126 is used to supply a current to a circuit that is formed by the connection of both ends of patch cord 32 via connectors 106 to respective receptacles 38. More specifically, with reference to FIG. 25, a schematic of the circuit formed by the connection of opposite ends of a patch cord 32 is shown with a voltage source applied across each LED 78. The voltage source is supplied by power supply unit 126. Unit 126 has a portable housing 136 which preferably contains a 9-volt battery source. A probe 138 extends from housing 136 via a power cord 140. Probe 138 has a removable end 142, as shown in FIGS. 13 and 14. End 142 has a distal portion with a generally C-shaped cross section forming a pair of attaching flanges 144. Each flange 144 has a ridge 146 formed adjacent its distal end and on its inner surface. A pair of electrical contact prongs 148 are positioned within a connecting area 150 formed between flanges 144. Area 150 is configured to correspond to the portion of terminal housing 118 containing terminal portions 125. Area 150 receives the rearward surface of housing 118 such that prongs 148 slide into corresponding plug apertures 134 to provide electrical connection between prongs 148 and terminal portions 125, as best shown in FIGS. 15–17. When prongs 148 engage portions 125, flanges 144 cover the side surfaces of housing 118 and each ridge 146 engages a small shoulder 152 formed at that transition between connector body 116 and housing 118, as shown in FIG. 16. Thus, probe end 142 can be removably and electrically connected to either one of the connectors 106 disposed on opposite ends of patch cord 32. Prongs 148 of end 142 are electrically connected to opposite ends of the battery source in supply unit 126. By actuating switch 154 on unit 126, a voltage is supplied across LEDs 78 and a current runs through the circuit formed by connection of the ends of patch cord 32. Thus, current passing through LEDs 78 will cause them to light up. Preferably, LEDs 78 will be constructed to blink upon the passage of current therethrough such that each of the connected ends of patch cord 32 will have an associated blining LED.

Probe end 142 can be removably attached to cord 140 via a removable plug member 156, as shown in FIGS. 13 and 14. More specifically, end 142 may wear out over time due to repeated connection and removal thereof to connectors. Instead of discarding an entire supply unit 126, end 142 can simply be replaced. Plug member 156 simply has plug terminals that connect with opposite ends of contact prongs 148. End 142 is removably attached to plug member 156 via resilient latch member 158. Housing 136 of unit 126 can have an LED disposed of its upper surface to indicate when switch 154 has been thrown. Additionally, housing 136 can have a magnetic strip (not shown) adhesively attached to one side for hands-free attachment of the housing to a metal frame 34.

In operation, a plurality of indicator assemblies 50 are secured to receptacles 38 found on frames 34 and 36 in the manner described above. Once snapped onto a receptacle 38, as shown in FIG. 6, an assembly 50 will remain therewith during numerous connections and reconnections of patch cords 32. After assemblies 50 have been attached, the appropriate receptacles on frame 34 can be attached to the appropriate receptacles on frame 36 via patch cords 32 and connectors 106, as shown in FIGS. 8 and 11. As described above, when a connector 106 is mated with a receptacle 38, the plug protrusion 128 of the connector is mated with the plug area 102 of the associated assembly 50. Therefore, when both ends of patch cord 32 are connected, a circuit exists between the LEDs associated with the connected receptacles via wires 110.

As is apparent, a plurality of patch cords are used to connect frames 34 and 36. After the original installation of a patch cord, it may be necessary or desirable to either reposition an end of the patch cord or it may be necessary to replace an entire patch cord. In order to accomplish the removal or repositioning without disrupting other surrounding patch cords, it is necessary to locate the corresponding receptacles to which the opposite ends of the patch cord is attached. In order to do so, probe end 142 is connected to one end of the patch cord via the associated connector 106, as shown in FIG. 17. Upon connection of probe end 142, a voltage potential can be applied to the circuit formed by the patch cord and the indicator assemblies such that current flows through LEDs 78 and causes them to light up and blink, thus indicating where both ends of the patch cord are connected. As is apparent, the end of the patch cord opposite to the connection of supply unit 126 can then be disconnected and reconnected to a different desired receptacle, or the entire patch cord can be replaced. The signal transmission of adjacent receptacles is therefore not disturbed in any manner. Additionally, there is no possibility for mistakenly removing a patch cable end due to mislabeling, or incorrect computer indexing, as was often the case with prior patch cord systems. Further, the blinking LED offers a vibrant indication of the ends of the patch cord which can be seen from a relatively long distance, which is advantageous over the prior art systems utilizing transmission of light through optical fibers. The electrical system utilized in the present invention is also not susceptible to the attenuation problem associated with prior light transmission systems. The easy snap-on assembly of the indicator assemblies 50 onto receptacles 38 allows adaption or upgrading of existing distribution frames or devices without substantial structural modification of the frame or device. Additionally, the securement of the indicator assemblies 50 to the receptacles 38, such that they remain with the receptacle during connecting or disconnecting of patch cords 32, ensures that the semifragile LED is not damaged due to mishandling or dropping of the patch cord as often occurs. Lastly, securing indicator assemblies 50 to receptacles 38 ensures an even distribution spacing between the indicator assemblies such that the location of the desired receptacle can be seen from a relatively substantial distance and likely will not be obscured by overlapping with adjacent cords as can happen when an indicator is attached to the patch cord itself.

With references to FIGS. 18–22, an alternative indicator assembly 160 is shown. Assembly 160 is used in conjunction with a different type of receptacle 162. More specifically, receptacle 162 snaps into a slidable tray 164 which can then be disposed in an appropriate distribution frame, as shown in FIG. 22. Receptacles 162 are attached to tray 164 via a snapping structure 166 which allows repositioning of receptacles 162 along tray 164.

Each receptacle 162 has formed therewith a pair of outwardly flexing attaching tabs 168. Each tab 168 has a through aperture 170. Assembly 160 utilizes only module 54 without shroud 52 or cover 56. More specifically, the identical module 54 used in assembly 50 is used in assembly 160. Module 54 is simply snapped between tabs 168 so that tabs 168 are received in recesses 86 and ridges 90 are received in apertures 170, as best shown in FIGS. 18 and 20. In this manner, module 54 can be securely attached to receptacle 162. A spacer 172 is disposed on the lower surface of receptacle 162 and engages top surface 98 of module 54 so that the lower portion of receptacle 162, spacer 172, and indentation 84 form plug-in area 174. Plug-in area 174 is similar to plug-in area 102 in that it also receives protrusion 128 of a connector 106 to electrically connect LED 78. More specifically, when body 116 of a connector 106 is received in receptacle 162 to connect the signal transmission members, protrusion 128 will be received in area 174 such that prongs 82 engage terminal portions 124. A locating system utilizing indicator assemblies 160 operates in an identical manner to the locating system utilizing indicator assembly 50. More specifically, a module 54 is attached to each receptacle 162. Patch cords having connectors 106 and terminal housings 118 are used to connect the receptacles, thus creating a circuit between the LEDs associated with the connected receptacles via wires 110. Supply unit 126 is then utilized to apply a voltage potential to the circuit by connecting probe end 142 to the appropriate housing 118 of a connector 106. In this manner, corresponding ends of patch cord 32 can be located.

With reference to FIG. 23, a further alternative indicator assembly 176 is shown. Assembly 176 includes a generally C-shaped body 178 which fits at least partially around a receptacle 38. Body 178 has an LED 180 formed in one forward corner and has a pair of female plug contact points 182 formed on a forward surface on opposite sides of receptacle 38. Plugs 182 are electrically connected to opposing wires (not shown) extending from LED 180. Additionally, on each side of body 178 is formed an activator hole 184 which is used for application of a voltage source to the locator circuit. Body 178 can be attached to receptacle 38 via any suitable means, for instance, adhesive or a snap-on structure. Connector 106 needs to be modified in order to utilize assembly 176. More specifically, instead of terminal housing 118, there are a pair of terminal housings 186 formed on opposite sides of connector body 116. Each housing 186 has a male plug member 188 associated therewith which in turn is connected to one of wires 110. Each male plug 188 is received in a corresponding female plug 182 when connector 106 is positioned in receptacle 38. A voltage source can be supplied to the circuit formed by a patch cord and two of the connector assemblies 176 by application of a probe end (not shown) to one of the assemblies 176 via activation holes 184 such that terminals of the probe end can contact the male plugs 188 of connector 106. Assembly 176 operates in the same manner as assembly 50 in that application of a voltage source through a power supply unit will cause the indicator assemblies 176 associated with the connected receptacles to blink.

A further alternative indicator assembly 190 is shown in FIG. 24. Assembly 190 includes a metal clip 192 that clips onto a receptacle 38 and which has an LED 194 mounted thereto. One electrical wire (not shown) of the LED is attached to the metal clip and the other wire (not shown) is insulated from the metal clip and is attached to a spring contact member 196. A second spring contact member 198 is attached to clip 192 opposite spring contact member 196. Connector 106 is modified to include a metal contact area 200 on each side. Each contact area 200 is connected to a respective wire 110. Therefore, when connector 106 is positioned in receptacle 38, spring contact members 196 and 198 will contact respective contact areas 200 on the connector. Thereafter, if it becomes necessary to locate opposite ends of the patch cord, a voltage source can be applied to the circuit formed by applying probe leads (not shown) to spring contact members 196 and 198.

Although all the above embodiments are described with the LED being the light-emitting source, it is contemplated that other light-emitting sources could be utilized. For instance, the LED may be replaced by a flat ribbon light-emitting material that is triggered by an applied voltage. Additionally, although each of the above embodiments discloses applying a voltage to a circuit formed via direct mechanical contact With the circuit, a voltage applied via magnetic induction to the circuit is also contemplated, thus eliminating the need for contact points and allowing application of the voltage anywhere along the patch cord.

From the foregoing, it will be seen that this invention is one well-adapted to attain all the ends and objects, hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of this invention without departing from the scope thereof, it is to be understood that all matter herein set forth or shown in the accompanying drawings is to be interpreted as illustrative and not in a limiting sense.

We claim:

1. A system for locating corresponding ends of a patch cord used to conduct a signal between a first receptacle and a second receptacle, the system comprising:

a cable having a main signal transmission means and a pair of electrically conductive members extending along the length of the cable;

a first connector attached to one end of said cable and a second connector attached to the other end of said cable, said first and second connectors adapted to removably mate with the first and second receptacles, respectively, said first connector having a pair of leads associated therewith, each lead connected to and corresponding to one of said conductive members, said second connector has a pair of contact points, one of said contact points is in electrical connection with one of said conductive members and the other of said contact points is in connection with the other conductive member;

an electrical indicator attached to said first receptacle, said indicator electrically connected to said pairs of leads when said first connector is mated to said first receptacle; and a power supply having a pair of probe leads connectable to said pair of contact points for selectively applying a current through said conductive members so that upon application of said current said indicator is activated.

2. The system of claim 1 wherein said power supply is portable.

3. The system of claim 1 wherein said first connector has a rigid body and said leads are rigidly secured to said body.

4. The system of claim 1 wherein said indicator is a LED.

5. The system of claim 1 wherein said signal transmission means is an optical fiber.

6. The system of claim 1 wherein said conductive members are wires.

7. The system of claim 6 wherein said wires are made of copper.

8. The system of claim 1 wherein said indicator is attached to the first receptacle via an adaptor body, said adaptor body presenting a pair of electrical leads for connecting said connector leads to said indicator.

9. The system of claim 8 wherein said adapter body leads are in the form of prongs and said connector leads are disposed in apertures formed in said connector for receiving said prongs.

10. The system of claim 1 further comprising:

a pair of leads associated with said second connector, each second connector lead connected to and corresponding to one of said conductive members; and a second electrical indicator attached to the second receptacle, said second indicator electrically connected to said second connector leads when said second connector is mated to the second receptacle;

wherein application of said current to said first and second conductive members results in activation of both said first and second indicators.

11. An indicator assembly adapted for attachment to a patch cord receptacle, the receptacle configured to mate with a patch cord connector disposed on one end of a cable having a main signal transmission member, the connector having two electrical leads that are electrically connected to corresponding conductive members that extend along the cable, the indicator assembly comprising:

an indicator module having an electrical indicator disposed therein that indicates the presence of a current through the indicator, said module having a pair of leads connected to the electrical indicator that are located to contact the pair of leads of the connector when the connector engages the receptacle; and means for attaching said indicator module to the receptacle.

12. The indicator assembly of claim 11 wherein said attaching means includes a pair of spaced outwardly deformable tabs extending from one side of the receptacle, said module received between said tabs in a snapping action to attach said module to the receptacle.

13. The indicator assembly of claim 11 wherein said attaching means includes a shroud for surrounding both the receptacle and said module so that said module is attached to the receptacle.

14. The indicator assembly of claim 13 wherein said module snaps into said shroud and said shroud snaps onto the receptacle.

15. The indicator assembly of claim 11 wherein said module leads generally face the connector to engage the connector leads when the connector is mated with the receptacle.

16. The indicator assembly of claim 15 wherein said module leads are prongs and the connector leads are disposed in apertures formed in the connector.

17. The indicator assembly of claim 11 wherein said module has a recess in which said module leads are disposed and the connecter has a projection containing the connector leads, and wherein said recess of said module is adapted to engage the projection of the connector when the connector is mated with the receptacle so that said module leads are in electrical contact with the connector leads.

18. A patch cord coupling assembly for coupling one end of a signal transmission cable to a communications device, the cable including a main signal transmission member and two conductive members, the coupling assembly comprising:

a receptacle mounted to a communications device and having a body forming a first recess that is disposed at the device and a second recess, said body also having an electrical indicator, said second recess containing a pair of leads electrically connected to said indicator; and a connector attached to one end of said cable, said connector having a first protrusion containing an end of the main signal member and a second protrusion containing a pair of leads, each connector lead connected to one of the conductive members;

wherein said first protrusions received in said first recess to connect the main signal member to the device and said second protrusion is received in said second recess so that said second protrusion leads contact said leads of said second recess, and wherein applying a current through said conductive members results in activation of said indicator.

19. The coupling assembly of claim 18 wherein said receptacle body includes an indicator module attached thereto, said indicator module forming at least a portion of said second recess.

20. The coupling assembly of claim 18 wherein said receptacle leads are prongs and wherein said second protrusion leads are disposed in apertures for receiving said prongs.

21. The coupling assembly of claim 18 wherein said indicator is an LED.

22. The coupling assembly of claim 18 wherein said connector includes a pair of contact points in electrical contact with the conductive members, said contact points adapted to be attached to a power source for applying a current to said indicator.

23. The coupling assembly of claim 22 wherein one of said contact points is in electrical connection with one of the conductive members and the other of said contact points is in electrical connection with the other of the conductive members.

24. A connector for attachment to one end of patch cord and adapted to mate the patch cord with a device receptacle, the receptacle having an electrical indicator associated therewith, the patch cord having a main signal transmission member and a pair of conductive members, said connector comprising:

a main body for attaching the signal transmission member to the receptacle;

a terminal housing having a pair of channels, each channel having an electrical terminal attached to a respective conductive member, said housing having a forward facing surface with a pair of apertures providing access to said channels so a pair of contacts can be inserted into the channels to contact the electrical terminals so an electrical connection can be completed with the indicator and a rearwardly facing surface having a pair of apertures allowing access to said channels so that a pair of leads from a power supply can be inserted into the channels to contact the electrical terminals so a voltage can be applied across the indicator.

25. A method for locating corresponding ends of a patch cord used to conduct a signal between a pair of receptacles, the patch cord including a cable having a main signal transmission member, a pair of electrically conductive members and at least one connector attached to one end of said cable for removably mating with one of the receptacles, the connector having a pair of leads associated therewith, each lead connected to and corresponding to one of the conductive members; the method comprising:

attaching an indicator module to the one receptacle, the indicator module having an electrical indicator disposed therein that indicates the presence of a current through the indicator, the module having a pair of leads connected to the electrical indicator that are located so that the connector leads are electrically attached to the pair of leads of the indicator;

supplying a current to the conductive members so as to activate the indicator.

26. The method of claim 25 wherein said current is supplied by creating a voltage potential between the conductive members.

27. The method of claim 26 wherein said current is supplied by a portable voltage device.

* * * * *